United States Patent
Evans et al.

(10) Patent No.: US 7,716,699 B2
(45) Date of Patent: May 11, 2010

(54) CONTROL AND PLAYBACK OF MEDIA OVER NETWORK LINK

(75) Inventors: Glenn F. Evans, Kirkland, WA (US);
Todd Bowra, Redmond, WA (US);
Ashley C. Speicher, Redmond, WA (US); Gurpratap Virdi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 637 days.

(21) Appl. No.: 11/478,480

(22) Filed: Jun. 29, 2006

(65) Prior Publication Data

US 2008/0005676 A1 Jan. 3, 2008

(51) Int. Cl.
*H04N 7/167* (2006.01)
(52) U.S. Cl. .......................... 725/31; 725/89; 725/134; 725/142
(58) Field of Classification Search .................. 725/31, 725/89, 134, 142
See application file for complete search history.

(56) References Cited

U.S. PATENT DOCUMENTS

| | | | |
|---|---|---|---|
| 6,229,895 B1* | 5/2001 | Son et al. ..................... | 380/200 |
| 6,260,143 B1 | 7/2001 | deCarmo | |
| 6,681,326 B2* | 1/2004 | Son et al. ..................... | 713/150 |
| 6,990,671 B1* | 1/2006 | Evans et al. .................. | 719/318 |
| 2003/0009668 A1 | 1/2003 | Chan et al. | |
| 2003/0072453 A1 | 4/2003 | Kelly et al. | |
| 2004/0049688 A1 | 3/2004 | Candelore et al. | |
| 2004/0078822 A1* | 4/2004 | Breen et al. ................... | 725/86 |
| 2004/0100889 A1 | 5/2004 | Ueki | |
| 2004/0114759 A1 | 6/2004 | Yoshimura et al. | |
| 2004/0250273 A1* | 12/2004 | Swix et al. .................... | 725/25 |
| 2004/0264927 A1 | 12/2004 | Evans et al. | |
| 2005/0050345 A1* | 3/2005 | Dowdy et al. ................ | 713/193 |
| 2005/0066353 A1* | 3/2005 | Fransdonk .................... | 725/29 |
| 2005/0076304 A1 | 4/2005 | Shing | |
| 2005/0132405 A1* | 6/2005 | AbiEzzi et al. ............... | 725/61 |
| 2005/0201726 A1 | 9/2005 | Malcolm et al. | |
| 2005/0235338 A1* | 10/2005 | AbiEzzi et al. .............. | 725/142 |
| 2006/0031888 A1* | 2/2006 | Sparrell ........................ | 725/78 |
| 2006/0212720 A1* | 9/2006 | Sutardja ...................... | 713/193 |
| 2006/0212721 A1* | 9/2006 | Sutardja ...................... | 713/193 |
| 2007/0083467 A1* | 4/2007 | Lindahl et al. ................ | 705/50 |
| 2007/0174639 A1* | 7/2007 | Reckless ..................... | 713/193 |
| 2007/0288967 A1* | 12/2007 | Candelore et al. ............. | 725/50 |

OTHER PUBLICATIONS

"DVD-Video Features & Functions", http://stream.uen.org/medsol/dvd/pages/dvdvid_features_copyprot.html.
"Preserving an Effective DVD Copy Protection System",http://www.macrovision.com/pdfs/Preserving-an-effective-DVD-Copying-System_0303.pdf.
Eschenfelder, Kristin R., et al,"Who posts DeCSS and why?: A content analysis of Web sites posting DVD circumvention software",http://www3.interscience.wiley.com/cgi-bin/abstr.

* cited by examiner

*Primary Examiner*—Christopher Kelley
*Assistant Examiner*—Mulugeta Mengesha

(57) ABSTRACT

A home entertainment network transmits audio/video decrypted from a DVD over a network to a media receiver using a secure channel. The A/V data is re-encrypted in a second encryption format amenable to transmission over the network. The media stream is thereby compliant with copy protection and digital rights management requirements. The media server constructs an emulated user interface corresponding to an actual instantiation of a navigation menu on the media server to solicit user input at the media receiver. The media server alternatively constructs a unique identifier of the DVD based upon the file structure on the DVD to search for menu navigation commands over an external network for heuristic navigation control.

20 Claims, 7 Drawing Sheets

US 7,716,699 B2

CONTROL AND PLAYBACK OF MEDIA OVER NETWORK LINK

BACKGROUND OF THE INVENTION

Home entertainment networks are becoming popular and allow media stored on or accessible by a computer functioning as a media server at a central location to be presented at multiple nodes on more traditional presentation devices, such as a television, in a separate room from the computer. In order for a television to present such media, it is often connected with a digital media receiver, which in turn is connected with the computer over a home entertainment network. Similar networks are often found in hotel environments that offer video on demand services from a collection of movies and other programming stored on a central media server. The media server may function as a video jukebox by storing movies and other videos on a hard drive or by housing multiple (potentially hundreds) Digital Video Discs (DVDs) in a jukebox device (either internal or attached to the media server) that loads a selected DVD in a platter for optical reading and playback.

When serving media content (e.g., music, pictures, videos, television, etc.) to other computers and electronic devices on the home network, certain types of content do not naturally accommodate simple linear playback across a network. DVDs are one such type of content. Commercial DVD content is generally protected by content scrambling system (CSS), Advanced Access Content System (AACS), and other similar encryption schemes. Further, content on the DVD is stored in sections (e.g., chapters) that do not strictly following the ultimate presentation order. Thus, typical network streaming solutions for media content are not directly applicable because if merely copied directly from the DVD, not only would the data still be encrypted, the streamed data may be out of order and not suitable for linear playback by a media receiver in real time.

In a home entertainment network and similar environments, the decryption of a DVD thus occurs at the media server for the video media to be transmitted to the media receiver as a linear stream. This configuration results in unencrypted data being transmitted across a network. Such unencrypted transmissions generally violate content usage restriction licenses and other digital rights management (DRM) policies. Thus, current DVD remote playback solutions that rely upon bypassing the CSS protection present on DVDs have resulted in industry consortiums and content representatives initiating litigation against the companies marketing these solutions.

In addition to providing media to a remote rendering device, the computer may supply graphical components to the media receiver for the rendering of a user interface (UI) on the television. Such controls are generally rudimentary and merely offer the user the ability to start and stop the presentation.

SUMMARY

Functionality is provided to a media server of a home entertainment network to transmit audio/video (A/V) decrypted from a DVD over a network to a media receiver using a secure channel that protects the media content in accordance with associated copyright licenses or DRM policies. Once the A/V data is decrypted from the DVD, it is re-encrypted in a second encryption format amenable to transmission over a network. Because the A/V data is re-encrypted before transmission, the media stream is compliant with DRM requirements. The media receiver may be connected with a presentation device such as a television or other display device and loudspeakers for presentation of the media. The media receiver may further be equipped with processing hardware and software to decrypt and possibly decompress the incoming media stream and convert the digital data to analog signals for playback on an attached presentation device.

The media server may construct an emulated UI corresponding to an actual instantiation of a navigation menu on the media server to solicit user input at the media receiver. The media server may construct a unique identification record of the DVD based upon the file structure on the DVD or other identifying features and use the identification record to search for additional content related to the DVD or for menu navigation instructions. In one implementation, the emulated UI may be navigated in response to user input received at the media receiver and transmitted to the media server. In an alternate implementation, the media server may generate a UI and transmit the UI to the media receiver for presentation to and reception of input from the user. The media receiver may then transmit user input to the media server for manipulation of the DVD media. In another implementation, the UI may be navigated without user input, but instead based upon algorithms, in some implementations employing heuristic logic.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

DETAILED DESCRIPTION OF THE INVENTION

The systems and methods described herein are designed to allow protected navigable media content on a storage medium in a variety of formats, e.g., DVD, High Definition DVD (HD-DVD, and Blu-Ray Disc (BD), housed or otherwise stored at a first device to be read at the first device and transmitted to a second device over a network in a protected manner. In this document, the term "navigable media content" means digital media content, e.g., audio/video content, with integral navigation elements, e.g., menu structures or other controls that allow the selection of particular or alternative subdivisions of the content. Navigable media content may or may not have integral copy protection features. Also, for simplicity, in the remainder of this document the term "DVD" is meant to refer to DVD, HD-DVD, BD, and any other digital storage mediums and related formats providing digital video content unless explicitly stated otherwise.

Figure 1:
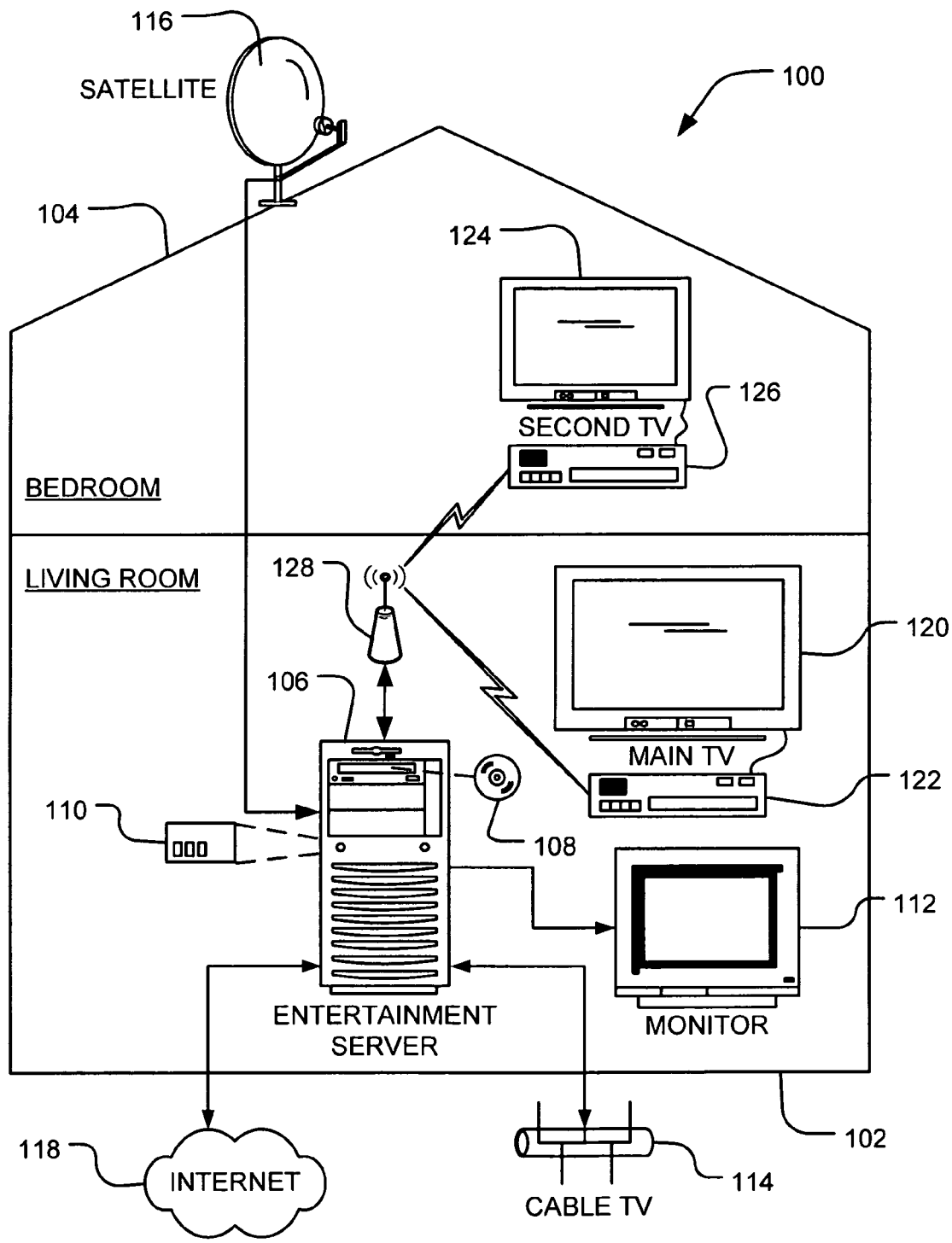
FIG. 1 is a schematic diagram of an implementation of a home entertainment environment.

Playback of navigable media content, e.g., DVDs, from a media server for local rendering by a networked media receiver on an attached presentation device according to implementations described herein may be understood in the context of a home entertainment network. FIG. 1 depicts an exemplary home entertainment environment 100 including a living room 102 and a bedroom 104. Central to the home entertainment environment 100 is a media server 106, in this implementation situated in the living room 102; however, the media server 106 could be located anywhere within the house.

In one implementation, the media server 106 is a conventional personal computer (PC) configured to run a multimedia software package, for example, the Windows® XP Media Center Edition operating system (Microsoft Corporation, Redmond Wash.). In such a configuration, the media server 106 is able to integrate full computing functionality with a complete home entertainment system into a single PC. For example, a user may watch television (TV) in one graphical window of a display device, while sending e-mail or working on a spreadsheet in another graphical window on the same display device.

In addition, the media server 106 may also include other features or components, for example: a personal video recorder (PVR) to capture live TV shows for future viewing or to record the future broadcast of a single program or series; an optical disc drive 108 for compact disc (CD) or DVD media playback; a disc jukebox for housing and selecting CD and DVD media from a large collection of discs; a memory drive 110 for integrated storage of and access to a user's recorded content, such as TV shows, songs, pictures, and home videos; and an electronic program guide (EPG).

Several content protection schemes may be used for media data stored on DVD discs both to prevent copying and for component or device authentication to ensure authorized playback. These schemes may include CSS used for DVD-video, AACS for HD-DVD and BD video formats, content protection for prerecorded media (CPPM) used for DVD-audio, and content protection for prerecorded media (CPRM) that may be used for DVD-audio or DVD-video. For example, in a CSS scheme for DVD-video, a DVD drive 108 only reads digital data from a DVD after the CSS compliant DVD drive 108 authenticates that the DVD drive 108 includes a CSS compliant decryption module or descrambler. A CSS compliant DVD drive 108 reads data and key materials from the DVD and sends the data and key materials to a destination for playback only after such authentication. A CSS compliant descrambler is capable of extracting a decryption key from the key materials.

Instead of a conventional PC, the media server 106 may comprise a variety of other devices capable of storing and distributing media content including, for example, a notebook or portable computer, a tablet PC, a workstation, a mainframe computer, a server, an Internet appliance, or combinations thereof. The media server 106 may also be a set-top box capable of delivering media content to a computer where it may be streamed, or the set-top box itself may stream the media content. As the media server 106 may be a full-functioning computer running an operating system, the user may also have the option to run standard computer programs (e.g., word processing and spreadsheets), send and receive emails, browse the Internet, or perform other common functions.

In addition to storing media content, the media server 106 may be connected with a variety of media sources, for example, a cable connection 114, a satellite receiver 116, an antenna (not shown for the sake of graphic clarity), and/or a wide area network such as the Internet 118. A user may thus control a live stream of media content (e.g., TV content) received, for example, via the cable connection 114, the satellite receiver 116, or antenna. This capability may be enabled by one or more tuners residing in the media server 106. The one or more tuners may alternatively be located remotely from the media server 106. In either case, the user may choose a tuner to fit any particular preferences. For example, a user wishing to watch both standard definition (SD) and high definition (HD) content may employ a tuner configured for both types of contents. Alternatively, the user may employ an SD tuner for SD content and an HD tuner for HD content separately.

The TV content may be received as an analog signal (e.g., frequency modulated) or a digital signal (e.g., pulse code modulated) via the cable connection 114, the satellite receiver 116, the antenna, or over the network 118. The received TV content may include discrete content packets, where each content packet includes actual TV content (i.e., audio and video data) and a policy or policies associated with the actual TV content. If TV content is received as an analog signal, discrete content packets may be created from the analog signal.

Digital rights management (DRM) policies may be employed to protect the actual TV content or A/V content digitally stored on the media server 106. Licenses may therefore be associated with the actual TV or A/V content. A license identifies keys used to decrypt audio, video, and TV content (e.g., content packets) that are encrypted as part of DRM. In particular, the keys are used to allow consumption or use of the actual video and TV content. In certain implementations, the content packets of received TV content may be encrypted or compressed. Encrypted content packets are typically decrypted with keys transmitted to or resident at a playback device or other home network devices.

The home entertainment environment 100 may also include one or more network devices functioning as media receivers 122, 126 placed in communication with the media server 106 through a network 128, for example, a local area network (LAN). The environment may also include remote input devices (127) such as a remote, keyboard or mouse. In an exemplary embodiment, the media receivers 122, 126 may be a Media Center Extender device, for example, an Xbox 360™ (Microsoft Corporation, Redmond, Wash.). The media receivers 122, 126 may also be implemented as any of a variety of conventional media rendering or computing devices, including, for example, a set-top box, a television, a video gaming console, a desktop PC, a notebook or portable computer, a workstation, a mainframe computer, an Internet appliance, a handheld PC, a cellular telephone or other wireless communications device, a personal digital assistant (PDA), or combinations thereof. Each of the media receivers 122, 126 may additionally have optical disc drives for CD or DVD media playback, memory drives to allow the media receiver to function as a DVR, and/or a tuner as described above.

The network 128 may comprise a wired and/or wireless network, for example, cable, Ethernet, WiFi, a wireless access point (WAP), or any other electronic coupling means.

The network 128 may enable communication between the media server 106, the media receivers 122, 126, and any other connected device through packet-based communication protocols, such as transmission control protocol (TCP), Internet protocol (IP), real time transport protocol (RTP), and real time transport control protocol (RTCP). Communications may be transmitted directly between devices over a LAN, or they may be carried over a wide area network (WAN), for example, the Internet 118. Also, DRM policies with respect to the media receivers 122, 126 may apply over the network 128 verify the output characteristics to match content license restrictions (e.g., CSS requirements on output resolutions or analog and digital content protection mechanisms such as HDCP or Macrovision).

One or more video display devices, for example a main TV 120 in the living room 102, a secondary TV 124 in the bedroom 104, and a video monitor 112 may be situated throughout the home environment 100. These video display devices may be connected with the media server 106 via the network 128 either directly or via the media receivers 122, 126. The main TV 120 and the secondary TV 124 may be coupled to the media receivers 122, 126 through wireless means or conventional cables. The video monitor 112 may be coupled with the media server 106 directly via a video cable. Media content including TV content may thus be supplied to each of the video display devices 112, 120, 124 over the home network 128 from the media server 106 situated in the living room 104.

The media receivers 122, 126 may be configured to receive streamed media content, including video and TV content, from the media server 106. Media content, and particularly video and TV content, may be transmitted from the media server 106 to the media receivers 122, 126 as streaming media comprised of discrete content packets via any of the network protocols described above. The streamed media content may comprise video IP, SD, and HD content, including video, audio, and image files, decoded on the media receivers 122, 126 for presentation on the connected TVs 120, 124 or other display devices. The media content may further be "mixed" with additional content, for example, an EPG, presentation content related to the media content, a web browser window, and other UI environments transmitted from the media server for output on the TVs 120, 124 or the monitor 112. Such additional media content may be delivered in a variety of ways using different protocols, including, for example, standard remote desktop protocol (RDP), graphics device interface (GDI), or hyper text markup language (HTML).

In addition to the media receivers 122, 126 and the presentation devices 112, 120, 124, the media server 106 may be connected with other peripheral devices, including components such as digital video recorders (DVR), cable or satellite set-top boxes, speakers, and a printer (not shown for the sake of graphic clarity). The media server 106 may also enable multi-channel output for speakers. This may be accomplished through the use of digital interconnect outputs, such as Sony-Philips Digital Interface Format (S/PDIF) or TOSLINK® enabling the delivery of Dolby Digital, Digital Theater Sound (DTS), or Pulse Code Modulation (PCM) surround decoding.

Figure 2:
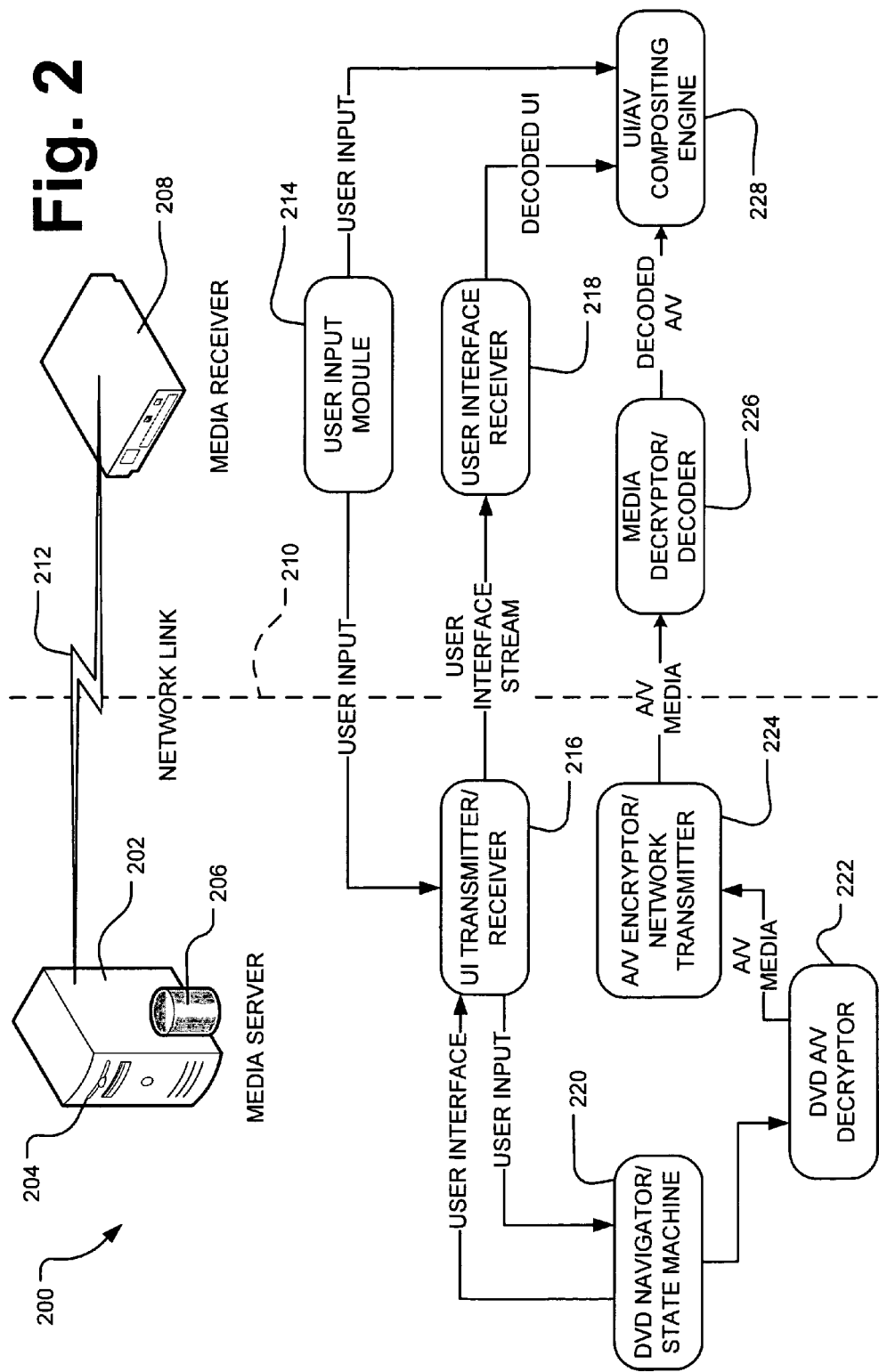
FIG. 2 is a schematic diagram of a first implementation of a communication configuration between a media server and a media receiver.

FIG. 2 provides an overview of a first exemplary implementation of a component configuration 200 that provides for approved network transmission of a DVD present in a DVD drive 204 of a media server 202 or a DVD that has been copied to a hard drive 206 of the media server 202 for playback by a networked media receiver device 208. The component configuration 200 further enables a user of the media receiver 208 to browse the menu system of a DVD housed in or stored on the media server 202. As described above, the media receiver 208 may be connected via a network link 210 within a local network 212 (e.g., an IP network) to the media server 202. The media receiver 208 may have an optical disc drive for CD or DVD media playback. The media receiver 208 may also or alternately have a memory drive to allow the media receiver 208 to function as a DVR. A presentation device, e.g., a television or monitor, may be connected with the media receiver 208 to present the DVD media content and related UI components streamed from the media server 202 to the user.

Each of the media server 202 and the media receiver 208 may comprise several modules or components that may be implemented in software, hardware, or a combination of both. The media server 202 may comprise a UI transmitter/receiver module 216, a DVD navigator/state machine module 220, a DVD A/V decryption module 222, and an A/V encryption/network transmitter module 224. The media receiver 208 may comprise a user input module 214, a UI receiver module 218, a media decryption/decoder module 226, and a UI/AV compositing engine module 228. The DVD navigator/state machine 220, the user input module 214, and the UI/AV compositing engine 228 are similar in nature to components employed when playing a DVD directly on a PC or a dedicated DVD player device. The components of FIG. 2 differ, however, in that they are adapted to enable the presence of the network link 210 between them as the user input module 214 and the UI/AV compositing engine 228 reside on the networked media receiver 208 rather than on the media server 202.

When a user wishes to watch a DVD located at the media server 202, the user input module 214 accepts the request from the user (e.g., via remote control, keyboard, mouse, joystick, or other input device) at the media receiver 208 and transmits the user input over the network link 210 to the UI transmitter/receiver 216 at the media server 202. The UI transmitter/receiver module 216 receives user input commands from the media receiver 208 and forwards them to the DVD navigator module 220 requesting navigation information for the menu functions of the DVD. The DVD navigator module 220 may be a CSS or AACS compliant decryption module, or otherwise compliant with other appropriate encryption or scrambling schemes. The DVD navigator module 220 loads the navigation system from the DVD and transmits one or more components of the DVD menu UI to the media receiver 208 via the UI transmitter/receiver 216.

In one implementation, the menu UI transmitted to the UI receiver 218 at the media receiver 208 may merely be a screen emulation of the menu UI that is actually instantiated on the media server 202. The UI compositing engine 228 of the media receiver 208 may provide a representation of the user's input commands from the user input device superimposed on the screen emulation passed from the UI receiver 218. The user input module 214 further transmits the input commands across the network link 210 to the media server 202 within a user input channel. The input commands are recognized and stored by the DVD navigator/state machine 220 for navigation of the DVD menu and selection of media. Thus, the DVD navigation actually occurs at the media server 202, although to the user it appears that the navigation is implemented on the local media receiver device 208. An exemplary screen emulation interface capable of providing the functionality described herein may be Remote Desktop Protocol (Microsoft Corporation, Redmond, Wash.).

Using the emulation interface, the user then navigates the DVD menu system and selects a specific media segment, e.g., a program, alternate track, bonus feature, or other clip, on the DVD to play using the input device. The user's input is received at the user input module 214 and transmitted across the network link 210 to the media server 202 and is again directed to the DVD navigator module 220. The DVD navigator module 220 performs DVD navigation to locate and coordinate the content fragments on the DVD in the correct order for playback and maintains a DVD state machine to track the video and features selected by the user. The DVD navigator module 220 also causes the selected video media to be read from the DVD and forwarded to the DVD A/V decryption module 222, which decrypts the media files stored on the DVD, for example, from a CSS format, so the media files may be played or transmitted.

In an alternative implementation, the DVD navigator module 220 may pass the data files constituting the navigation menu on the DVD to the A/V encryption/network transmitter module 224 for transmission to the media receiver 208. The DVD navigator module 220 may also identify the file structure or other storage structure of the remaining fragmented data files on the DVD and construct a representation of the file structure. The representation of the file structure may also be transmitted to the media receiver 208 by, for example, the UI transmitter/receiver 216. The UI/AV compositing engine 228 at the media receiver 208 may thereby render an actual navigational menu interface, rather than an emulation, to present to the user. When a user makes a menu selection, the user input module 214 actually sends a navigation command to the DVD navigator module 220 via the UI transmitter/receiver 216, rather than merely a signal corresponding to a manipulation of the input device. In this implementation, the state machine for tracking the user's prior menu selections may reside on the media receiver 208 rather than on the media server 202. In this implementation, the media server 202 thus functions primarily as a file server without the additional navigation control functionality previously described.

Timing, composition, and display information corresponding to the video may be sent from the media receiver 208 back to the media server 202. The media server 202 may use this information to control any end-to-end latency, improve responsiveness, and provide dynamic quality control of a user interface presented at the media receiver 208. For example, along with user input the media receiver 208 may transmit its local composition clock to the media server 202 to indicate the content that has been decompressed and displayed. With this information, the media server 202 may decrease the amount of data sent to the media receiver 208 and thus decrease the time required for a screen update to occur in response to a user's input action. When the media server 202 determines that the content transmitted is no longer interactive, the media server 202 may increase the buffering of data to improve compression efficiency or network resilience.

In order to transmit the media content over the network link 210, for example, for presentation on another TV in the home network 212, the media content may be re-encrypted to achieve compliance with copy protection and DRM policies controlling the media content. The A/V encryption/network transmitter module 224 re-encrypts the media files into a second format suitable for transmission over the network 212 and real-time playback of a digital media stream by the media receiver 208.

Exemplary network transmission encryption technologies may include Windows Media DRM for Network Devices (WMDRM-ND) (Microsoft Corporation, Redmond, Wash.) and Digital Transmission Content Protection over Internet Protocol (DTCP-IP). WMDRM-ND and DTCP-IP are technologies that may be used to protect copyrighted content transferred over IP home networks. Under these specifications, digital content can be shared securely between devices in a user's home but not shared with third-parties outside the home network. Using authentication schemes, these specifications allow the user to designate devices in the home network as trusted destinations that can transfer data back and forth, but will not allow the content to be transmitted over the Internet to be shared outside of the home network.

At the media receiver 208, the A/V media stream is received, decrypted, and decoded by the media decryption/decoder module 226. The decoded A/V content is then passed to the UI/AV compositing engine 228. The UI receiver module 218 on the media receiver 208 also passes UI information, for example, the DVD menu emulation interface, to the UI/AV compositing engine 228. As the media receiver 208 is simultaneously receiving UI and A/V information, the UI/AV compositing engine 228 combines the UI and A/V data into a composite image for presentation to the user on an attached presentation device.

Figure 3:
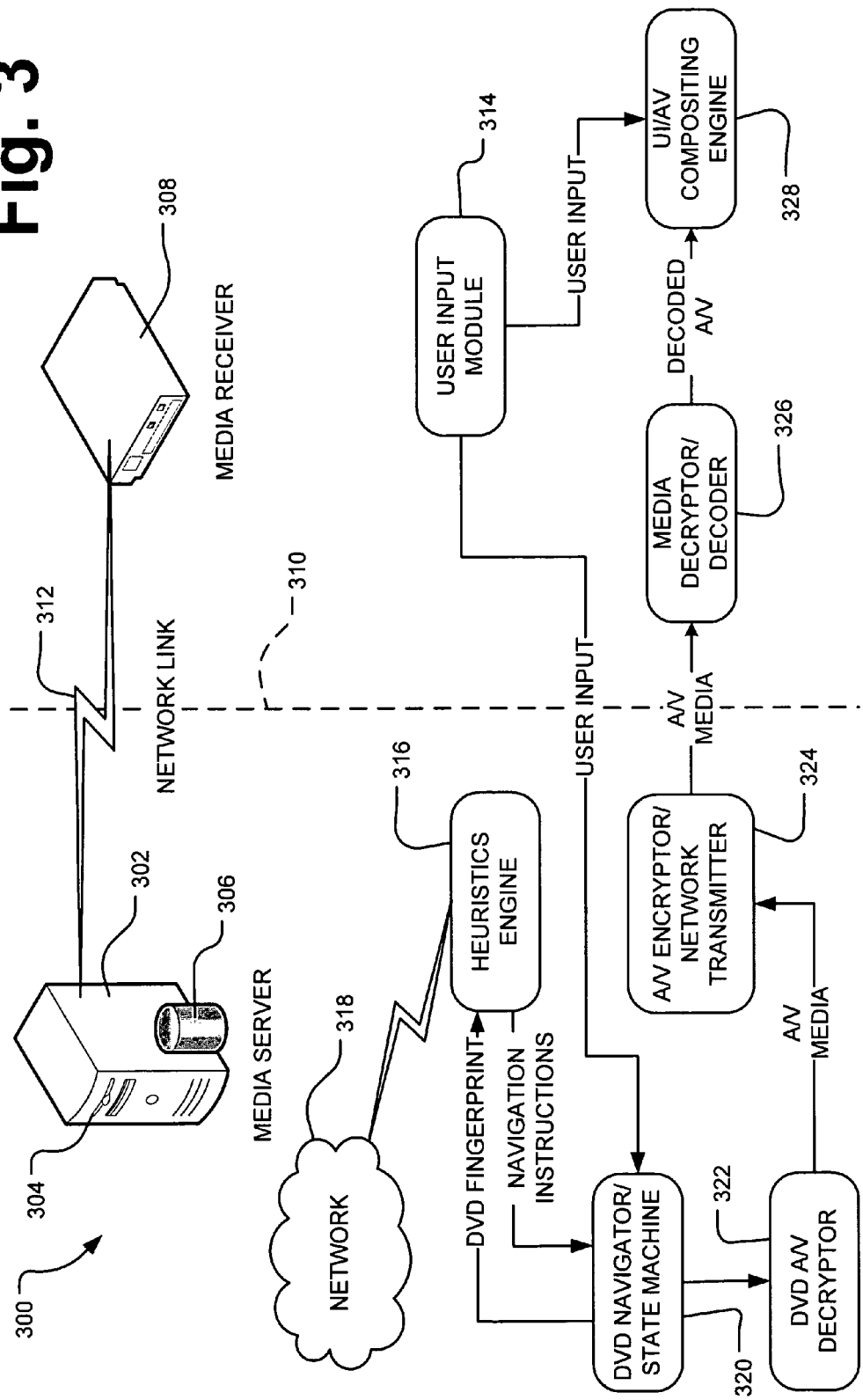
FIG. 3 is a schematic diagram of a second implementation of a communication configuration between a media server and a media receiver.

FIG. 3 provides an overview of a second exemplary implementation of a component configuration 300 that provides for approved network transmission of a DVD present in a DVD drive 304 of a media server 302 or a DVD that has been copied to a hard drive 306 of the media server 302 for playback by a networked media receiver device 308. As before, the media receiver 308 may be connected via a network link 310 within a local network 312 (e.g., an IP network) to the media server 302. The media receiver 308 may have an optical disc drive for CD or DVD media playback. The media receiver 308 may also or alternately have a memory drive to allow the media receiver 308 to function as a DVR. A presentation device, e.g., a television or monitor, may be connected with the media receiver 308 to present the DVD media content and related UI components streamed from the media server 302 to the user. Contrary to the configuration described above with respect to FIG. 2, the media receiver 308 of the component configuration 300 of FIG. 3 has no capability to support remote UI emulation. Thus, there is no ability for the user to navigate the menu of a DVD housed in or stored on the media server 302.

Each of the media server 302 and the media receiver 308 may comprise several modules or components that may be implemented in software, hardware, or a combination of both. The media server 302 may comprise a heuristics engine module 316, a DVD navigator/state machine module 320, a DVD A/V decryption module 322, and an A/V encryption/network transmitter module 324. The media receiver 308 may comprise a user input module 314, a media decryption/decoder module 326, and a UI/AV compositing engine module 328.

When a user wishes to watch a DVD located at the media server 302, the user input module 314 accepts the request from the user (e.g., via remote control, keyboard, mouse, joystick, or other input device) at the media receiver 308 and transmits the user input over the network link 310 to the media server 302. The media receiver 308 may provide a local UI as part of an operating system allowing the user to select a DVD from the DVD library stored at the media server 302. The media server 302 may transmit a list of programming options to the media receiver 308 over the network link 310 for presentation to the user within the local UI. This local UI may be presented to the user by the UI/AV compositing engine 328 at the media receiver 308. The user's selections via the user input module 314 may also be indicated in the presentation rendered by the UI/AV compositing engine 328.

When received at the media server 302, the user input command from the media receiver 308 indicating a DVD selection may be passed to the DVD navigator module 320. The DVD navigator module 320 may be a CSS or AACS compliant decryption module, or otherwise compliant with other appropriate encryption or scrambling schemes. The DVD navigator module 320 reads the menu from the selected DVD. As noted, in this exemplary implementation the media receiver 308 lacks the capability to present an emulation of the DVD menu once accessed by the DVD navigation module 320. Thus, no menu options may be provided to or menu selections received from the media receiver 308. Without further instructions, the DVD navigator module 320 has no direction for selection of the media content.

In this implementation, the DVD navigator module 320 is connected with a heuristics engine 316 that aids in menu navigation and content selection. The DVD navigator module 320 creates a unique identifier or "fingerprint" of the selected DVD and passes the fingerprint to the heuristics engine 316. An exemplary method for creating a fingerprint is described in greater detail below with respect to FIG. 4. The heuristics engine 316 may interface with an external network 318, e.g., the Internet, to access a source of information about the selected DVD based upon the unique identifier. For example, an information repository accessible over the external network 318 may provide menu navigation commands for a large catalog of DVDs indexed by the unique identifiers.

The heuristics engine 316 may additionally determine the playback environment in order to aid the determination of appropriate commands for menu navigation for the selected DVD. As used herein, the term "heuristics" is generally meant to describe the use of algorithms to make determinations between possible navigation menu selections. For example, the heuristics engine 316 may query the operational configurations of the media receiver 308 and/or the media server 302 to determine the configurations of the operating systems and attached peripheral components. Through an understanding of the configuration of the components linked to the network 312, the heuristics engine 316 may make educated deductions to aid in the selection of menu navigation commands to select an appropriate media segment.

For example, if it is determined that the operating system of the media receiver 308 is set to U.S. English for the language of the interface and that there are two speakers attached to the media receiver 308, the heuristics engine 316 may request navigation instructions for the selecting a media segment on the DVD for playback of media content in English and in 2-channel stereo. In an alternate example, if it is determined that the operating system of the media receiver 308 is set to French for the language of the interface and that there are six speakers attached to the media receiver 308, the heuristics engine 316 may request navigation instructions for selecting a media segment on the DVD for playback of media content with French subtitles and in 6-channel surround sound.

The heuristics engine 316 thus formulates a request to the remote source for menu navigation commands using the fingerprint for the selected DVD and system configuration information. Once the command information is received by the heuristics engine 316 from the external network 318, the command information is passed to the DVD navigator 320. The DVD navigator module 320 performs DVD navigation based upon the menu commands received from the heuristics engine 316. The DVD navigator 320 may also maintain a state machine to track the media segments and features selected. By implementing the menu commands, the DVD navigator module 320 also causes the selected video media to be read from the DVD and forwarded to the DVD A/V decryption module 322, which decrypts the media files stored on the DVD, for example, from a CSS format, so the media files may be played or transmitted.

In order to transmit the media content over the network link 310, for example, for presentation on another TV in the home network 312, the media content may be re-encrypted to achieve compliance with copy protection and DRM policies controlling the media content. The A/V encryption/network transmitter module 324 re-encrypts the media files into a second format suitable for transmission over the network 312 and real-time playback of a digital media stream by the media receiver 308. As described with respect to FIG. 2, exemplary network transmission encryption technologies may include WMDRM-ND and DTCP-IP.

At the network device, the A/V media stream is received, decrypted, and decoded by the media decryption/decoder module 326. The decoded A/V content is then passed to the UI/AV compositing engine 328. The user input module 314 on the media receiver 308 may also pass UI information generated by the media receiver 308 to the UI/AV compositing engine 328. As the media receiver 308 is simultaneously generating a UI and receiving A/V information, the UI/AV compositing engine 328 combines the UI and A/V data into a composite image for presentation to the user on an attached presentation device.

In an alternate implementation, the media server may not include a heuristics engine and the media receiver may not be equipped to support screen emulation for menu navigation. Thus, the user may be unable to select only desired portions or functions of a DVD housed at a central media server across the network at a media receiver node. In such a scenario, the media server may instead perform an authenticated key exchange, descramble the CSS, AACS, or other encoding, re-encrypt all of the files from the DVD, and transmit the entire DVD contents to the media receiver. In this manner, the media receiver may still be able to play the DVD locally without violation of the associated DRM and content protection policies.

In another implementation, the media receiver may have limited decoding or composition capabilities. In such a situation, the media server may locally generate a UI and compress it for transmission to the media receiver. The media receiver may then decompress the UI and combine it with the decompressed video stream.

Figure 4:
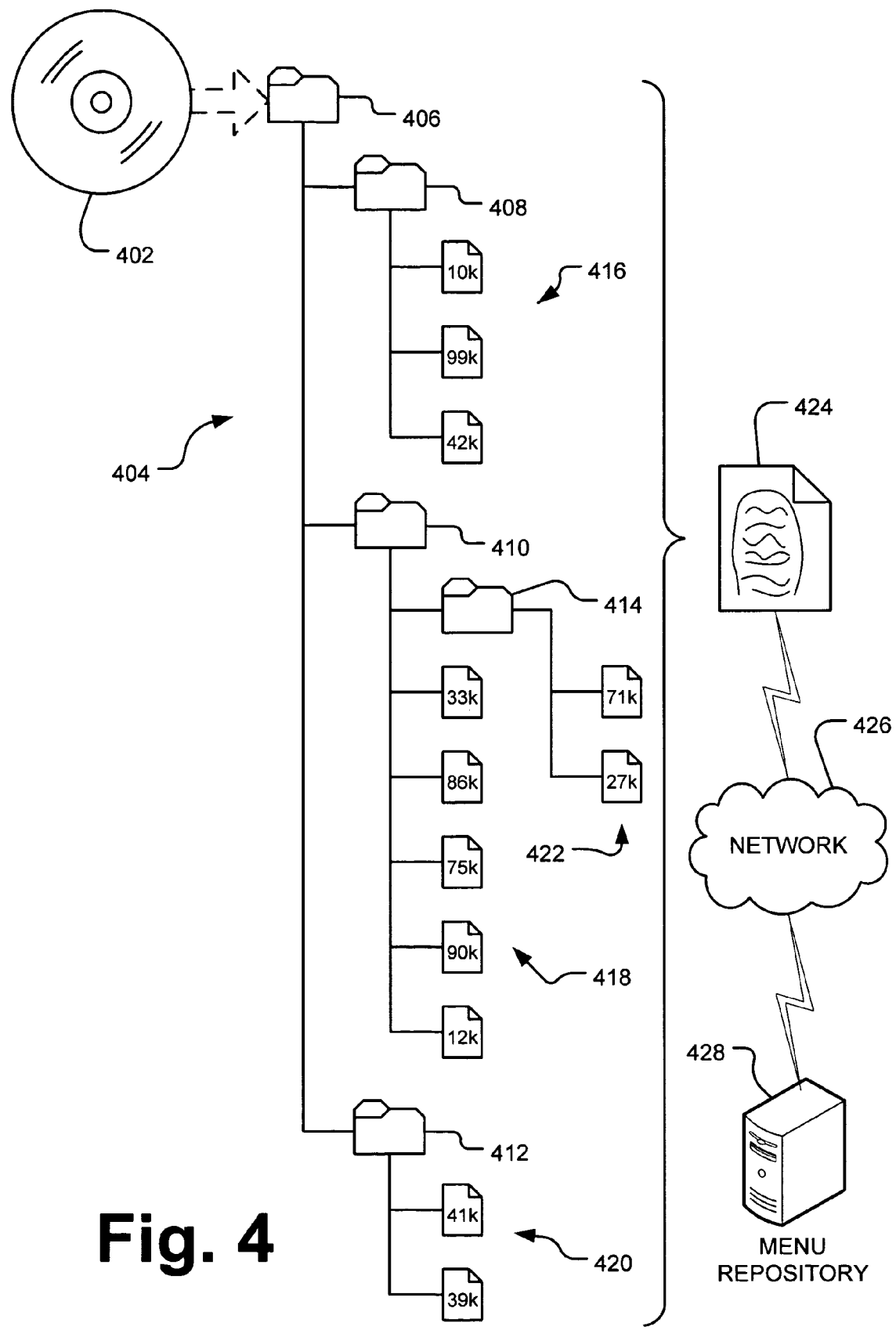
FIG. 4 is a schematic diagram of an implementation for creating a unique identification record for a DVD.

FIG. 4 schematically conceptually depicts an exemplary construct for creating a fingerprint of a DVD for use by the heuristics engine described in FIG. 3 in retrieving DVD menu navigation commands. Such DVD fingerprinting technology is described in greater detail in U.S. Pat. No. 6,871,012. The media content of a selected DVD 402 housed on the media server may be organized on the DVD 402 in a particular file structure 404. The file structure 404 may be understood in terms similar to the structures of files stored on PCs. The file structure 404 may comprise a primary folder 406 within which subordinate folders 408, 410, 412, 414 are nested. Additionally, although not depicted, individual files may also be stored directly within the primary folder 406.

A first subordinate folder 408 may house a number of individual content files 416 of various sizes. As shown in FIG. 4, three individual files are stored within the first subordinate folder 408. A second subordinate folder 410 may house a number of individual content files 418 of various sizes. As shown in FIG. 4, five individual files are stored within the second subordinate folder 410. A third subordinate folder 412 may house a number of individual content files 420 of various sizes. As shown in FIG. 4, two individual files are stored within the second subordinate folder 410. Additionally, subordinate folders may nest within other subordinate folders. As shown in FIG. 4, a fourth subordinate folder 414 is nested within the second subordinate folder 410 in addition to the individual content files 418. Two individual content files 422 of various sizes are stored within the fourth subordinate folder 414.

As is evident from the file structure 404, a particular DVD may be identified by its file structure, which will be unique to the particular DVD product. For example, each DVD copy of a particular movie will contain the exact same files of exactly the same names and sizes organized in exactly the same arrangement of folders. Thus, a unique identifier or fingerprint file 424 may be generated from a combination of this information. For example, a fingerprint file 424 may be formatted as an XML file with tags identifying each of the files, the file sizes, and the arrangement on the DVD. An alternative form of an exemplary fingerprint file 424 may be a hash value constructed from a mathematical representation of the file sizes and configurations. The hash would thus be unique to the media content of the particular DVD 402.

Once the fingerprint file 424 is created, it may be used by the heuristics engine on the media server to retrieve menu navigation commands over an external network connection 426, e.g., the Internet or from a local cache of menu navigation commands in a database on the media server. Menu navigation commands may be prepared for a multitude of DVDs and stored in a menu repository on a remote file server 428 accessible via the network 426. The fingerprint file 424 may be transmitted to the remote server 428 to identify the DVD 402 for which menu navigation commands are requested. Such navigation commands may be located by the unique identifier on the remote server 428 and sent to the media receiver via the external network 426.

Figure 5:
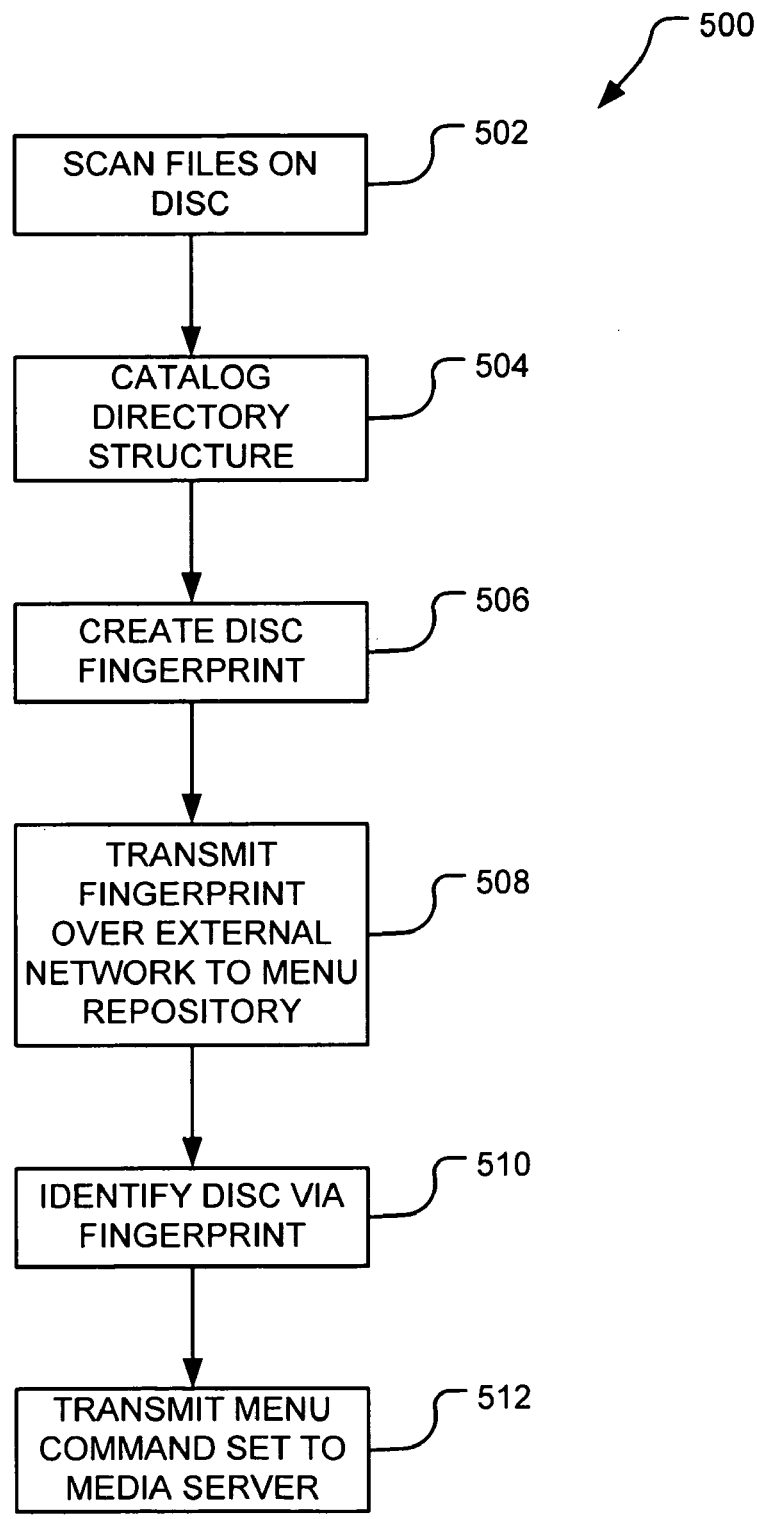
FIG. 5 is a flow diagram of a general implementation of operations for determining menu commands associated with a DVD.

FIG. 5 depicts an exemplary method 500 for implementation of the heuristic engine of FIG. 3 based upon the creation of the fingerprint file of FIG. 4. In a scanning operation 502, the selected DVD is scanned to identify the files on the disc. Next, in a cataloging operation 504, the directory structure of the files on the DVD is catalogued to include, for example, file sizes, positions, orders, and nesting relationships. From the cataloged file structure a unique identifier or disc fingerprint is created in a creation operation 506. The fingerprint file may then be transmitted over an external network to a menu repository on a remote file server in a transmission operation 508. The remote file server may then use the disc fingerprint to identify the menu operations associated with the particular DVD in an identifying operation 510. Then in a transmission operation 512, a menu command set associated with the particular DVD is transmitted over the external network to the media server to direct the navigation of the DVD menu and make appropriate playback selections.

Figure 6:
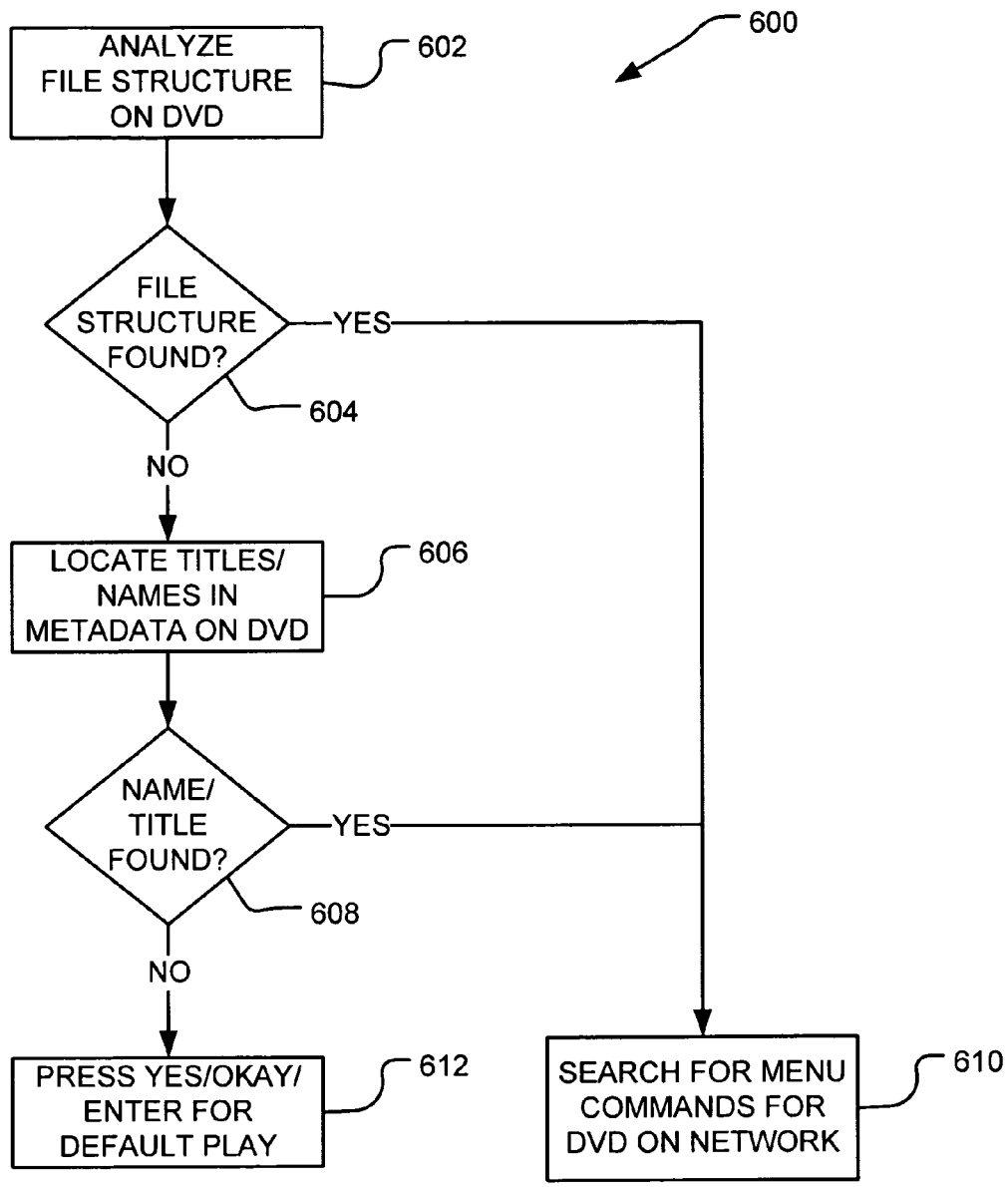
FIG. 6 is a flow diagram of a specific implementation of operations for determining menu commands associated with a DVD.

FIG. 6 depicts an exemplary methodology 600 for heuristically determining menu navigation commands to operate playback of a DVD from a media server in an environment unable to receive selections via user input. Initially, in an analyzing operation 602, the file structure of the DVD is analyzed in an attempt to create a disc fingerprint. A first query operation 604 may determine whether a file structure was found during the analyzing operation 602. If a file structure is recognizable, the heuristic process 600 may develop a search protocol for retrieving menu commands for navigating the DVD over an external network in a searching operation 610.

If a file structure cannot be discerned in the analyzing operation 602, the heuristic process 600 moves from the first query operation 604 to a location operation 606. In the location operation, the DVD is searched to determine whether there is any identifying information about the DVD, for example, in a metadata file on the disc. Possible identifying information may include a movie title, feature name, or other content descriptions. Other identifying information may include a serial number or other unique product identifier provided by the manufacturer. A second query operation 608, may determine whether any identifying information was found during the locating operation 606. If identifying information was located, the heuristic process 600 may develop a search protocol for retrieving menu commands for navigating the DVD over an external network in the searching operation 610.

If identifying information cannot be discerned in the locating operation 606, the heuristic process 600 moves from the second query operation 608 to a default selection operation 612. In the selection operation 612, the heuristic engine makes a determination that since specific menu commands may not be retrievable due to an inability to identify the DVD, the navigation module may merely initiate a generic "enter" (or "yes" or "okay") command. The selection of the enter command is based upon a general recognition that most DVDs will default to a menu position wherein selection of the enter command will initiate playback of the primary content on the DVD, e.g., the feature movie. It should also be recognized that the selection of a generic selection command to initiate playback may be used as the default heuristic option instead of the more involved fingerprint analyzing or information location operations described above.

Figure 7:
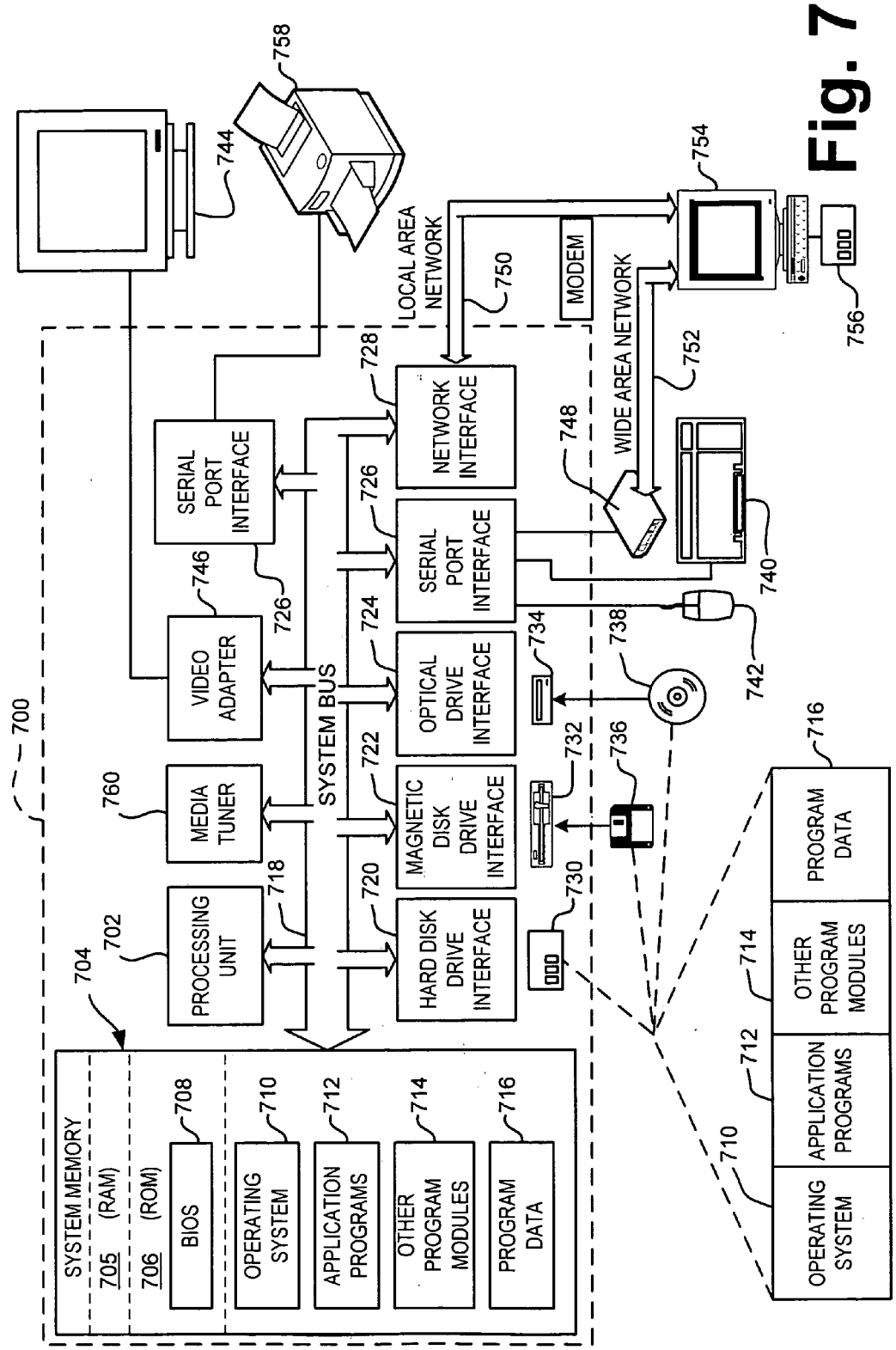
FIG. 7 is a schematic diagram of a general purpose computing system for implementing aspects of the home entertainment environment.

An exemplary hardware and operating environment for implementing the systems and methods described above is depicted in FIG. 7. As indicated above, the media server and the media receiver devices may comprise general purpose computing devices. A general purpose computing device may be the form of a computer 700, including a processing unit 702, a system memory 704, and a system bus 718 that operatively couples various system components, including the system memory 704 to the processing unit 702. There may be only one or there may be more than one processing unit 702, such that the processor of computer 700 comprises a single central processing unit (CPU), or a plurality of processing units, commonly referred to as a parallel processing environment. The computer 700 may be a conventional computer, a distributed computer, or any other type of computer; the invention is not so limited.

The system bus 718 may be any of several types of bus structures including a memory bus or memory controller, a peripheral bus, a switched fabric, point-to-point connections, and a local bus using any of a variety of bus architectures. The system memory 704 may also be referred to as simply the memory, and includes read only memory (ROM) 706 and random access memory (RAM) 705. A basic input/output system (BIOS) 708, containing the basic routines that help to transfer information between elements within the computer 700, such as during start-up, is stored in ROM 706. The computer 700 further includes a hard disk drive 730 for reading from and writing to a hard disk, not shown, a magnetic disk drive 732 for reading from or writing to a removable magnetic disk 736, and an optical disk drive 734 for reading from or writing to a removable optical disk 738 such as a CD, DVD, or other optical media.

The hard disk drive 730, magnetic disk drive 732, and optical disk drive 734 are connected to the system bus 718 by a hard disk drive interface 720, a magnetic disk drive interface 722, and an optical disk drive interface 724, respectively. The drives and their associated computer-readable media provide nonvolatile storage of computer-readable instructions, data structures, program modules, and other data for the computer 700. It should be appreciated that any type of computer-readable media that can store data that is accessible by a computer, for example, magnetic cassettes, flash memory cards, CDs, DVDs, RAMs, and ROMs, may be used in the exemplary operating environment.

A number of program modules may be stored on the hard disk 730, magnetic disk 732, optical disk 734, ROM 706, or RAM 705 including an operating system 710; one or more application programs 712, for example, a multimedia software package, other program modules 714, for example, an audio/video decoder, a UI generator, and a metadata decoder; and program data 716, for example, media content. A user may enter commands and information into the personal computer 700 through input devices such as a keyboard 740 and pointing device 742, for example, a mouse. Other input devices (not shown) may include, for example, a microphone, a joystick, a game pad, a tablet, a touch screen device, a satellite dish, a scanner, a facsimile machine, and a video camera. These and other input devices are often connected to the processing unit 702 through a serial port interface 726 that is coupled to the system bus 718, but may be connected by other interfaces, such as a parallel port, game port, or a universal serial bus (USB).

A monitor 744 or other type of display device is also connected to the system bus 718 via an interface, such as a video adapter 746. In addition to the monitor 744, computers typically include other peripheral output devices, such as a printer 758 and speakers (not shown). These and other output devices are often connected to the processing unit 702 through the serial port interface 726 that is coupled to the system bus 718, but may be connected by other interfaces, such as a parallel port, game port, or a universal serial bus (USB). In the case of a media server or media receiver, a tuner 760 may also be connected with the system bus in order to receive and convert analog content signals into digital format and similarly convert digital content into analog signals for transmission to connected devices.

The computer 700 may operate in a networked environment using logical connections to one or more remote computers, such as remote computer 754. These logical connections may be achieved by a communication device coupled to or integral with the computer 700; the invention is not limited to a particular type of communications device. The remote computer 754 may be another computer, a server, a router, a network personal computer, a client, a peer device, or other common network node, and typically includes many or all of the elements described above relative to the computer 700, although only a memory storage device 756 has been illustrated in FIG. 7. The logical connections depicted in FIG. 7 include a wired or wireless local-area network (LAN) 750, for example, an Ethernet network, or a WiFi network, and a wide-area network (WAN) 752, for example, a cable network or a telephony network. Such networking environments are commonplace in office networks, enterprise-wide computer networks, intranets and the Internet, which are all types of networks.

When used in a LAN 750 environment, the computer 700 may be connected to the local network 750 through a network interface or adapter 728, which is one type of communications device. When used in a WAN 752 environment, the computer 700 typically includes a modem 748, a network adapter, or any other type of communications device for establishing communications over the wide area network 752. The modem 748, which may be internal or external, is connected to the system bus 718 via the serial port interface 726. In a networked environment, program modules depicted relative to the personal computer 700, or portions thereof, may be stored in a remote memory storage device. It is appreciated that the network connections shown are exemplary and other means of and communications devices for establishing a communications link between the computers may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for remote playback of navigable media content over a network, the method comprising:

accessing, at a media server, locally stored navigable media content in response to user input received at a media receiver and transmitted to the media server over the network, the user input indicating selection of the navigable media content, the stored navigable media content encrypted in a first format according to a media storage device compliant content protection scheme and comprising integral menu navigation data for a navigation menu associated with the navigable media content, the navigation menu identifying media segments within the navigable media content and allowing selection of particular media segments from within the navigable media content that are stored out of order with respect to presentation order of the navigable media content;

instantiating, at the media server, the navigation menu associated with the stored navigable media content from the integral menu navigation data of the stored navigable media content;

navigating to a particular encrypted media segment within the navigable media content at the media server in response to a particular navigation command;

selecting the particular encrypted media segment from the navigable media content;

decrypting the particular encrypted media segment selected from the navigable media content at the media server in accordance with the media content storage device compliant content protection scheme;

re-encrypting the decrypted particular media segment at the media server in a second format suitable for network transmission; and transmitting the re-encrypted particular media segment from the media server to a remote media receiver over the network.

2. The method of claim 1, wherein the navigation menu instantiated at the media server is associated with navigable media content stored on a digital video disc housed at the media server and identifies one or more media segments within the navigable media content stored on the digital video disc.

3. The method of claim 1 further comprising
receiving one or more navigation commands input by a user at the media receiver and transmitted from the media receiver to the media server over the network.

4. The method of claim 1 further comprising:
transmitting a user interface from the media server to the media receiver for soliciting navigation commands from a user, the user interface emulating the navigation menu associated with the navigable media content instantiated at the media server.

5. The method of claim 1 further comprising
receiving a menu command set associated with the navigable media content from an external network server comprising a menu repository storing menu navigation commands for a catalog of navigable media content.

6. The method of claim 5 further comprising
determining a unique identifier for the navigable media content; and
transmitting the unique identifier to the external network server comprising a the menu repository storing menu navigation commands for the catalog of navigable media content.

7. The method of claim 1, wherein the selecting operation further comprises executing a default navigation command.

8. The method of claim 4 further comprising
compressing the user interface at the media server; and
transmitting the user interface to the media receiver for composition with the particular media segment.

9. The method of claim 8 further comprising
receiving composition timing information of a rendering process of the particular media segment and the user interface from the media receiver; and
controlling latency and interactivity of the user interface based upon the composition timing information.

10. A computer-readable storage medium having computer-executable instructions causing a computer to perform a computer process implementing the method of claim 1.

11. A method for remote playback of encrypted, navigable media content stored at a media server over a network, the method comprising
receiving, at the media server, user input indicating selection of the stored navigable media content, the user input transmitted from a media receiver to the media server over the network, the stored navigable media content encrypted in a format according to a media storage device compliant content protection scheme;
identifying menu navigation data integral with the stored navigable media content for a navigation menu associated with the navigable media content, the navigation menu identifying media segments within the navigable media content and allowing selection of particular media segments from within the navigable media content that are stored out of order with respect to presentation order of the media content;
instantiating, at the media server, the navigation menu associated with the stored navigable media content from the integral menu navigation data of the stored navigable media content;
transmitting the menu navigation data of the stored navigable media content from the media server to the media receiver for creation of a remote navigation menu interface at the media receiver;
receiving a navigation command input by a user at the media receiver and transmitted from the media receiver to the media server over the network;
navigating to a particular encrypted media segment within the navigable media content at the media server in response to the particular navigation command;
selecting the particular encrypted media segment from the navigable media content;
decrypting the particular encrypted media segment selected from the navigable media content at the media server in accordance with the media content storage device compliant protection scheme;
re-encrypting the decrypted particular media segment at the media server in a format suitable for network transmission; and
transmitting the re-encrypted particular media segment from the media server to the media receiver over the network.

12. The method of claim 11, wherein the navigation menu instantiated at the media server is associated with navigable media content stored on a digital video disc housed at the media server and identifies media segments within the navigable media content stored on the digital video disc.

13. The method of claim 11, further comprising
analyzing a storage structure of media data constituting the navigable media content; and
transmitting a representation of the storage structure to the media receiver for creation of the remote navigation menu interface at the media receiver.

14. A computer-readable storage medium having computer-executable instructions causing a computer to perform a computer process implementing the method of claim 11.

15. A method for algorithmically controlling playback of encrypted, navigable media content stored at a media server over a network, the method comprising
receiving, at the media server, user input indicating selection of the stored navigable media content, the user input transmitted from a media receiver to the media server over the network, the stored navigable media content encrypted in a first format according to a media storage device compliant content protection scheme and comprising integral menu navigation data for a navigation menu associated with the navigable media content, the navigation menu identifying media segments within the navigable media content and allowing selection of particular media segments from within the navigable media content that are stored out of order with respect to presentation order of the media content;
instantiating, at the media server, the navigation menu associated with the stored navigable media content from the integral menu navigation data of the stored navigable media content;
generating a navigation command;
navigating to a particular encrypted media segment within the navigable media content at the media server in response to the navigation command;
selecting the particular encrypted media segment from the navigable media content;
decrypting the particular encrypted media segment selected from the navigable media content at the media server in accordance with the media content storage device compliant protection scheme;

re-encrypting the decrypted particular media segment at the media server in a second format suitable for network transmission; and transmitting the re-encrypted particular media segment from the media server to a remote media receiver over the network.

16. The method of claim 15, wherein the generating operation further comprises determining a unique identifier corresponding to the navigable media content;

transmitting the unique identifier to an external network server comprising a menu repository storing menu navigation commands for the navigable media content; and receiving the navigation command for selecting the particular media segment from the external network server, wherein the navigation command corresponds to the unique identifier.

17. The method of claim 16, wherein the determining operation further comprises analyzing a storage structure of media data constituting the navigable media content; and creating the unique identifier based upon the storage structure.

18. The method of claim 16, wherein the determining operation further comprises analyzing the navigable media content to identify associated identifying metadata; and defining the identifying metadata as the unique identifier.

19. The method of claim 16 further comprising receiving configuration information corresponding to an operational configuration of the remote media receiver; and transmitting the configuration information to the external network server; and wherein the navigation command received from the external network server further corresponds to the configuration information.

20. A computer-readable storage medium having computer-executable instructions causing a computer to perform a computer process implementing the method of claim 15.

* * * * *

UNITED STATES PATENT AND TRADEMARK OFFICE
CERTIFICATE OF CORRECTION

| | | |
|---|---|---|
| PATENT NO. | : 7,716,699 B2 | |
| APPLICATION NO. | : 11/478480 | |
| DATED | : May 11, 2010 | |
| INVENTOR(S) | : Glenn F. Evans et al. | |

It is certified that error appears in the above-identified patent and that said Letters Patent is hereby corrected as shown below:

In column 15, line 7, in Claim 2, after "identifies" delete "one or more".

In column 15, line 29, in Claim 6, after "comprising" delete "a".

In column 16, line 29, in Claim 13, after "claim 11" delete ",".

Signed and Sealed this
Fifteenth Day of February, 2011

David J. Kappos
*Director of the United States Patent and Trademark Office*